United States Patent
Chang

(10) Patent No.: US 7,613,238 B2
(45) Date of Patent: Nov. 3, 2009

(54) APPARATUS AND METHOD FOR DECISION ERROR COMPENSATION IN AN ADAPTIVE EQUALIZER

(75) Inventor: Chiao-Chih Chang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 543 days.

(21) Appl. No.: 11/225,636

(22) Filed: Sep. 13, 2005

(65) Prior Publication Data

US 2007/0058710 A1 Mar. 15, 2007

(51) Int. Cl.
*H03H 7/30* (2006.01)
*H03H 7/40* (2006.01)

(52) U.S. Cl. .................. 375/233; 375/234; 375/236

(58) Field of Classification Search .......... 375/233, 375/265, 232, 341, 229, 225; 348/571, 558
See application file for complete search history.

(56) References Cited

U.S. PATENT DOCUMENTS

| | | | |
|---|---|---|---|
| 5,600,672 A * | 2/1997 | Oshima et al. ............ 375/219 |
| 5,757,855 A | 5/1998 | Strolle et al. ............ 375/262 |
| 6,240,133 B1 | 5/2001 | Sommer et al. |
| 6,337,878 B1 | 1/2002 | Endres et al. |
| 6,734,920 B2 | 5/2004 | Ghosh et al. ............ 348/614 |
| 6,775,334 B1 | 8/2004 | Liu et al. ............ 375/341 |
| 6,823,489 B2 | 11/2004 | Wittig et al. ............ 714/792 |
| 6,829,297 B2 * | 12/2004 | Xia et al. ............ 375/232 |
| 2002/0154247 A1 | 10/2002 | Ghosh et al. ............ 348/614 |
| 2002/0154248 A1 | 10/2002 | Wittig et al. ............ 348/614 |
| 2002/0172275 A1 | 11/2002 | Birru ............ 375/233 |
| 2004/0032529 A1 * | 2/2004 | Jeon et al. ............ 348/571 |
| 2004/0196933 A1 * | 10/2004 | Shan et al. ............ 375/346 |
| 2004/0258184 A1 | 12/2004 | Liu et al. ............ 375/350 |
| 2007/0206708 A1 * | 9/2007 | Kim et al. ............ 375/340 |

* cited by examiner

*Primary Examiner*—Chieh M Fan
*Assistant Examiner*—Qutbuddin Ghulamali
(74) *Attorney, Agent, or Firm*—Thomas, Kayden, Horstemeyer & Risley

(57) ABSTRACT

An adaptive equalizer comprises: a forward equalizer (FE) receiving a symbol stream to generate an FE output; a decision feedback equalizer (DFE) receiving a decision symbol stream to generate a DFE output; a first adder, coupled to the forward equalizer and the decision feedback equalizer, adding the FE and DFE outputs to generate an equalizer output; a first trellis decoder, coupled to the first adder, receiving the equalizer output to generate a trellis decoded stream by a trellis decoding process; and a compensator for compensating the equalizer output according to the decision symbol stream, the trellis decoded stream, and a coefficient vector stored in the decision feedback equalizer, to generate a compensated equalizer output.

8 Claims, 9 Drawing Sheets

APPARATUS AND METHOD FOR DECISION ERROR COMPENSATION IN AN ADAPTIVE EQUALIZER

BACKGROUND

The invention relates to digital television, and in particular, to an HDTV receiver capable of compensating decision error during equalization.

The ATSC standard for HDTV transmission over terrestrial broadcast channels uses a signal that consists of a sequence of twelve independent time-multiplexed trellis-coded data streams modulated as an eight level vestigial sideband (VSB) symbol stream with a rate of 10.76 MHz.

FIG. 1 shows a conventional adaptive equalizer. A forward equalizer (FE) 102 receives a symbol stream r(n) for performing linear equalization to generate an FE output. A decision feedback equalizer (DFE) 108 receives a decision symbol stream d(n) for performing decision feedback equalization to generate a DFE output. The FE and DFE outputs are added by a first adder 104 to generate an equalizer output y(n). The decision symbol stream d(n) is generated by a slicer 106 slicing the equalizer output y(n). The term "slice" refers to the process of taking the allowed symbol value that is nearest to that of the output signal equalizer output y(n).

After equalization, a HDTV signal is decoded by a trellis decoder 110 utilizing Viterbi algorithm based on a ½ rate trellis coding. In the trellis decoder 110, twelve trellis decoders operate in parallel in a time multiplexed fashion, followed by an RS decoder 112 performing byte de-interleaving and Reed Solomon decoding for further error correction.

Thus, a typical equalization can be expressed as:

$$y(n) = \sum_{k=0}^{K} r(n+k) \cdot c_{-k}(n) + \sum_{k=0}^{K} d(n-k) \cdot c_k(n) \quad (1)$$

where symbol stream r(n) is the received data stream at time n; equalizer output y(n) is the equalizer output stream at time n; decision symbol stream d(n) is a sliced data stream at time n; $c_{-k}(n)$ is an FE coefficient vector comprising K+1 coefficients; and the coefficient vector $c_k(n)$ is a DFE coefficient vector comprising K+1 coefficients.

FIG. 2 shows another conventional adaptive equalizer. The output from forward equalizer 102 is added to the DFE output from decision feedback equalizer 108 in first adder 104 to form the equalizer output y(n). The trellis decoder 110 receives the equalizer output y(n) and feeds back decision symbol stream d(n) to the decision feedback equalizer 108. The decision symbol stream d(n) is used to reduce errors in the decision feedback equalizer 108. The ATSC standard specifies a rate ½ code trellis decoder where the symbols are interleaved into twelve different trellis decoders. The ATSC standard specifies path memory output lengths from twelve symbols to sixteen symbols. Thus, in an ATSC trellis decoder, a path memory of twelve to sixteen stages is typically used before final symbol decisions are made, and the total twelve interleaved symbols sum up a delay of 144 to 192 symbols. The twelve to sixteen path memory stages output intermediate values having better precision than the "hard" decisions made in the decision feedback equalizer 108, thus they offer an improved estimate for the symbols provided to the decision feedback equalizer 108. The trellis decoded stream $d_t(n)$ can be one or more path memory outputs of different stages from the trellis decoder 110, each with precision proportional to the stage numbers.

SUMMARY

An exemplary embodiment of an adaptive equalizer providing decision error compensation comprises: a forward equalizer (FE) receiving a symbol stream to generate an FE output; a decision feedback equalizer (DFE) receiving a decision symbol stream to generate a DFE output; a first adder, coupled to the forward equalizer and the decision feedback equalizer, adding the FE and DFE outputs to generate an equalizer output; a first trellis decoder, coupled to the first adder, receiving the equalizer output to generate a trellis decoded stream by a trellis decoding process; and a compensator for compensating the equalizer output according to the decision symbol stream, the trellis decoded stream, and a coefficient vector stored in the decision feedback equalizer, to generate a compensated equalizer output.

The decision symbol stream may be a path memory output generated by the first trellis decoder, and alternatively, the adaptive equalizer may further comprise a slicer coupled to the first adder slicing the equalizer output, and the decision symbol stream is an output of the slicer.

The compensator comprises a first delay unit, a second delay unit, a comparator and an FIR array. The first delay unit receives the equalizer output and delays the equalizer output for a time m. The second delay unit receives the decision symbol stream and delays the decision symbol stream for the time m. The comparator generates an error signal by comparing the trellis decoded stream and the delayed decision symbol stream. The FIR array generates a summation from the multiplication of the coefficient vector and the error signal. Additionally, a second adder adds the equalizer output and the summation to generate the compensated equalizer output.

The FIR array comprises a multiplexer receiving and storing the Coefficient vector; a plurality of tap cells coupled in series to delay the error signal sequentially; a plurality of multipliers, each coupled to the multiplexer and one corresponding tap cell, multiplying a delayed error signal and one coefficient; and an accumulator for adding the multiplication results to generate the summation.

The multiplexer may comprise a selector processing the coefficient vector before output to the multipliers by outputting a coefficient to a corresponding tap cell if the coefficient exceeds a threshold or the adjacent coefficient exceeds a threshold, and omitting a coefficient if neither the coefficient nor the adjacent coefficient exceeds the threshold.

The multiplexer may comprise a controller, periodically delivering a control signal; and a buffer, coupled to the controller for storing the coefficient vector. When the control signal is delivered, the buffer is updated with the current coefficient vector from the decision feedback equalizer.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION

Figure 1:
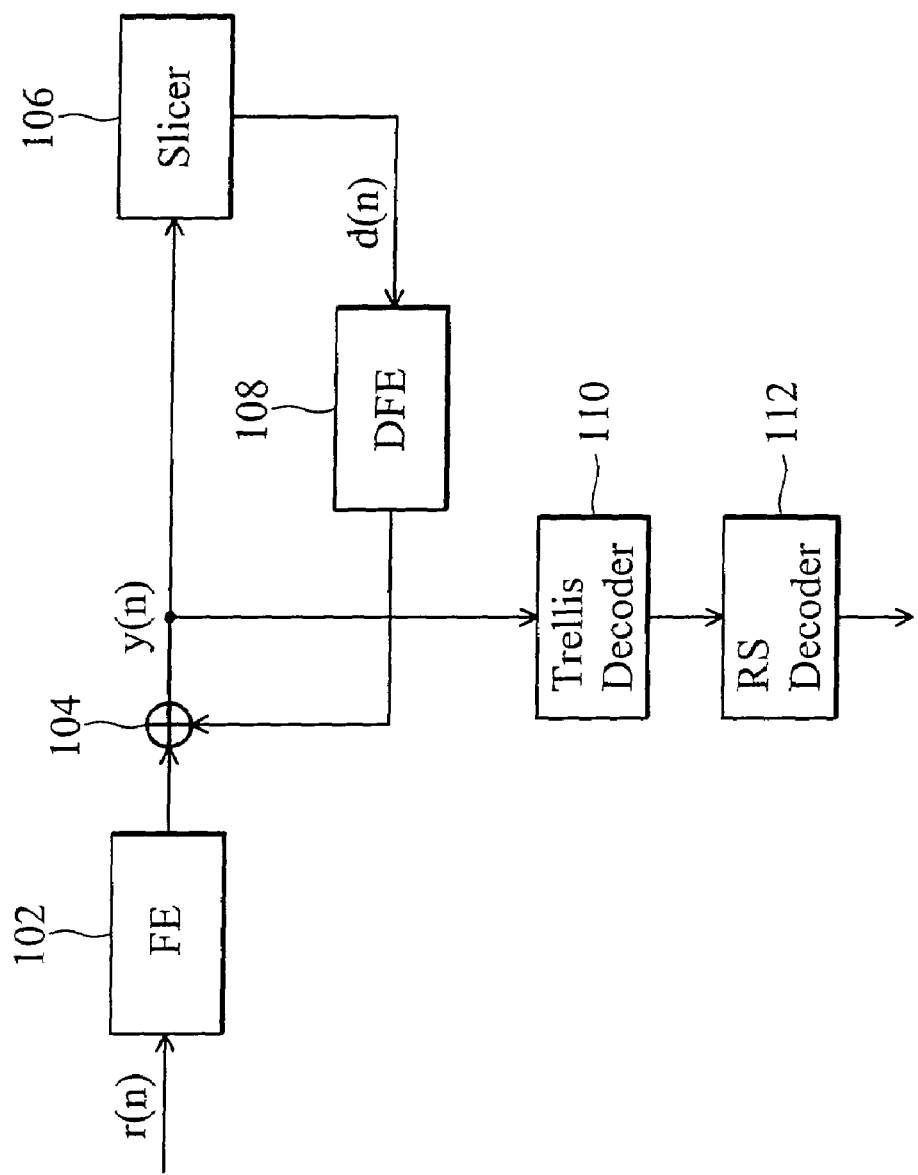
FIG. 1 shows a conventional adaptive equalizer.
Figure 2:
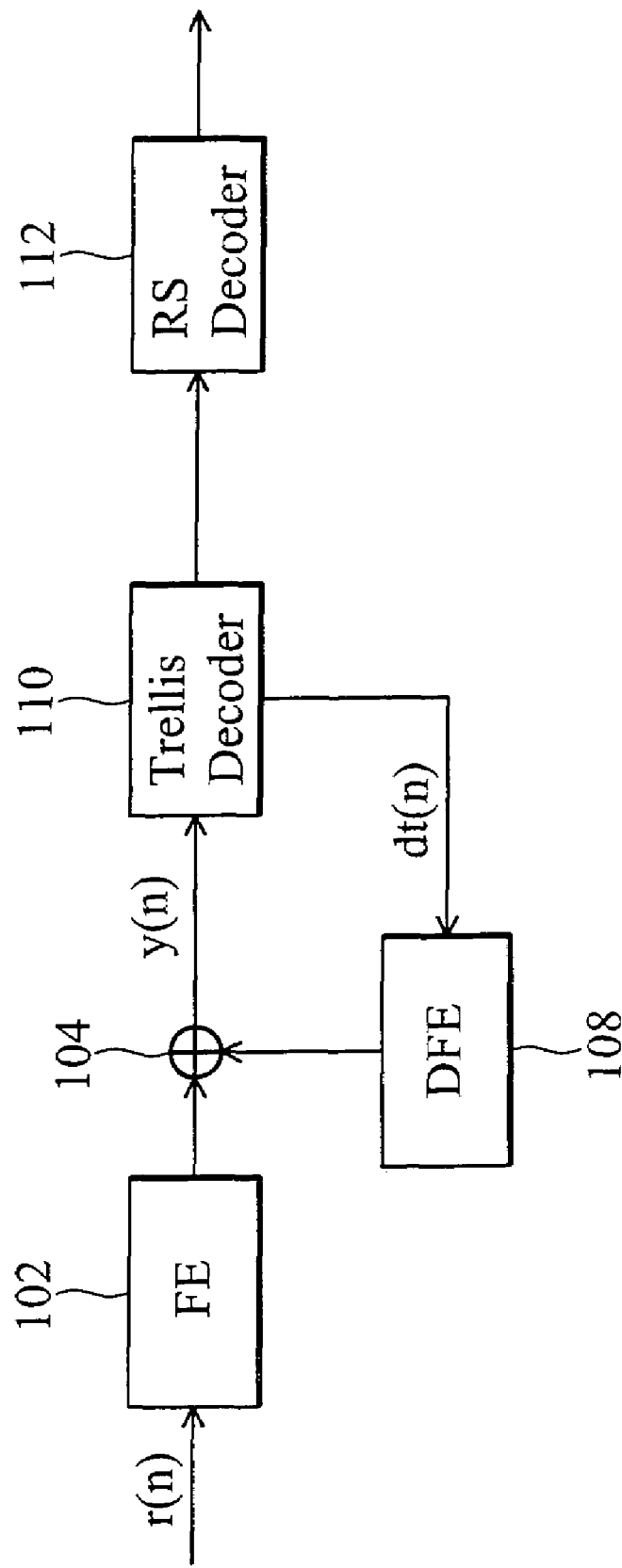
FIG. 2 shows another conventional adaptive equalizer.
Figure 3:
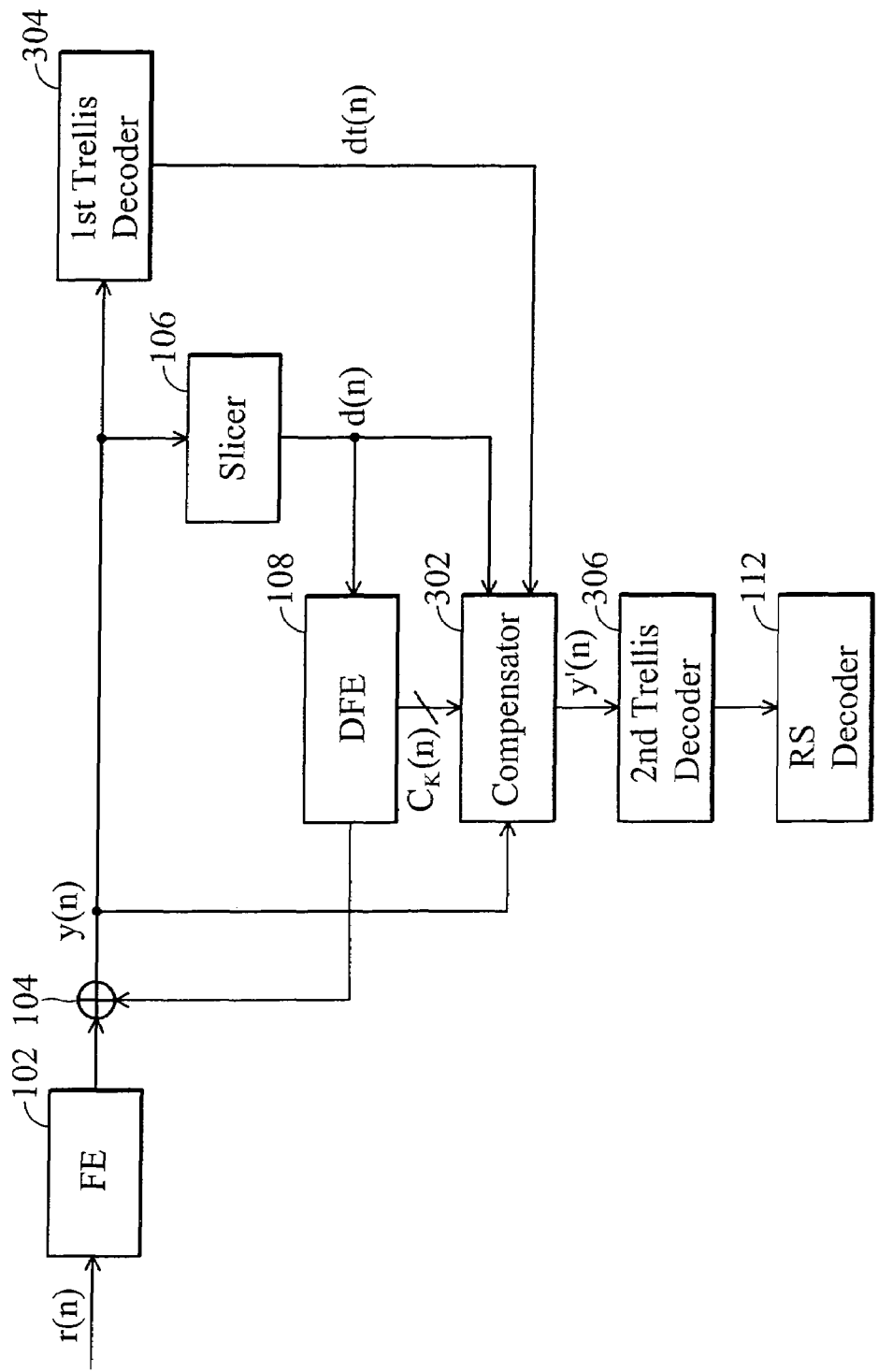
FIG. 3 shows an embodiment of a decision error compensating equalizer.

FIG. 3 shows an embodiment of a decision error compensating equalizer. A compensator 302 is provided to calculate the decision error and compensate the equalizer output y(n). In FIG. 3, a slicer 106 receives the equalizer output y(n) from the first adder 104, and feeds back the decision symbol stream d(n) to the decision feedback equalizer 108. A first trellis decoder 304 receives the equalizer output y(n) to compute a trellis decoded stream $d_t(n)$. The compensation generated by the compensator 302 is based on the decision symbol stream d(n), the trellis decoded stream $d_t(n)$ and coefficient vector $c_k(n)$ in the decision feedback equalizer 108. Additionally, a second trellis decoder 306 is provided for decoding the compensated equalizer output y'(n) generated from the compensator 302, the second trellis decoder 306 computes the second trellis decoded stream, and the RS decoder 112 performs further error correction from the second trellis decoded stream.

Figure 4:
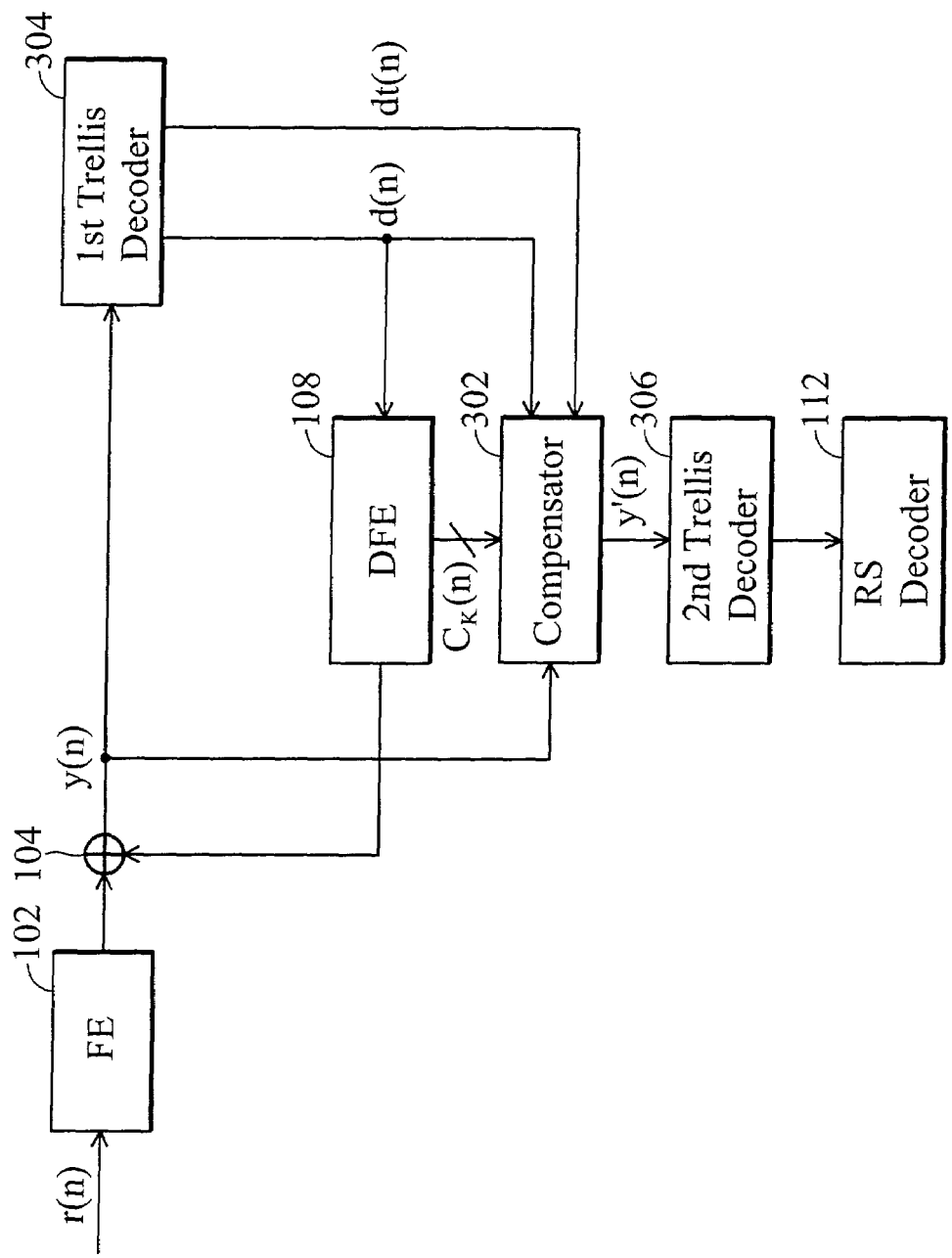
FIG. 4 shows another embodiment of the decision error compensating equalizer.

FIG. 4 shows another embodiment of the decision error compensating equalizer. The slicer 106 in FIG. 3 is not required here, and the decision symbol stream d(n) is generated from the first trellis decoder 304. As is known to the skilled in the art, a trellis decoder may comprise 12 to 16 traceback stages, therefore a path memory for storing each stage output is typically provided. The full traceback output, for example, a 16 stage traceback result, may form a trellis decoded stream $d_t(n)$. Additionally, a tentative result may be derived from lesser stage path memory, for example, a traceback result of only one or two stages. The tentative result is less reliable than the full trellis decoded result, however, it also requires less latency to generate. Therefore the tentative result may be employed to form a decision symbol stream d(n), with better precision than the slicer 106 generated one in of FIG. 3.

Figure 5:
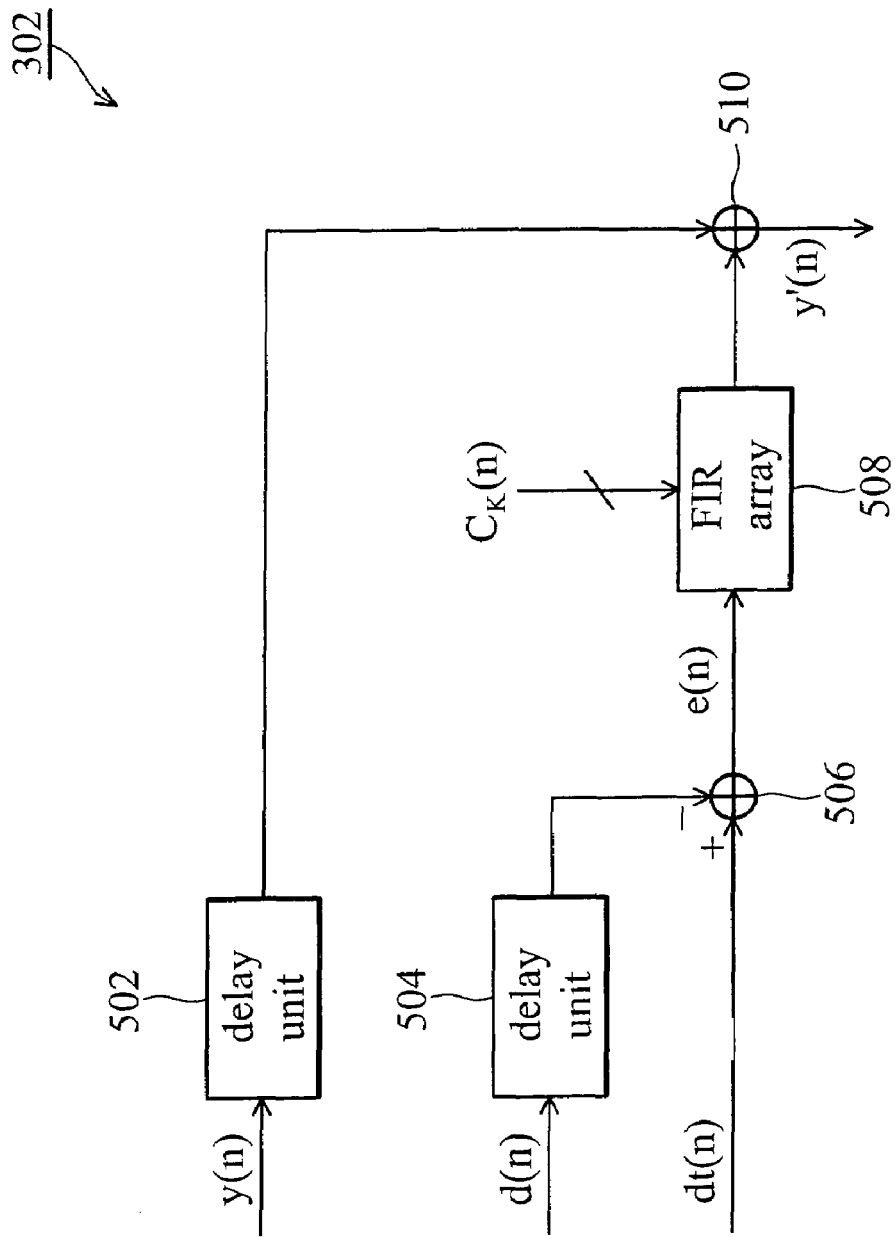
FIG. 5 shows an embodiment of the compensator 302.

FIG. 5 shows an embodiment of the compensator 302. The decision symbol stream d(n) and trellis decoded stream $d_t(n)$ are compared in the comparator 506 to estimate the error therebetween. Since the decision symbol stream d(n) and trellis decoded stream $d_t(n)$ are generated with different latency, a second delay unit 504 is provided to delay the decision symbol stream d(n) to obtain synchronization. For example, the delay unit 502 and 504 delay the incoming d(n) and $d_t(n)$ for a time m, where m maybe a period of symbol time dependent upon the trellis decoding latency. Therefore, the comparator 506 generates an error signal e(n) by:

$$e(n) = d_t(n) - d(n) \quad (2)$$

The compensator 302 comprises a finite impulse response (FIR) array 508, summing the coefficient vector $c_k(n)$ and error signal e(n) by:

$$\sum_{k=0}^{K} e(n-k) \cdot c_k(n) = \sum_{k=0}^{K} [d_t(n-k) - d(n-k-m)] \cdot c_k(n) \quad (3)$$

The equalizer output y(n) is delayed in the first delay unit 502 to meet the stream consistency with the summation from equation (3), and the second adder 510 compensates the equalizer output y(n) by adding the summation from equation (3) and the delayed equalizer output y(n) from first delay unit 502:

$$y'(n) = y(n-m) + \sum_{k=0}^{K} [d_t(n-k) - d(n-k-m)] \cdot c_k(n) \quad (4)$$

where m is the delayed time.

Figure 6:
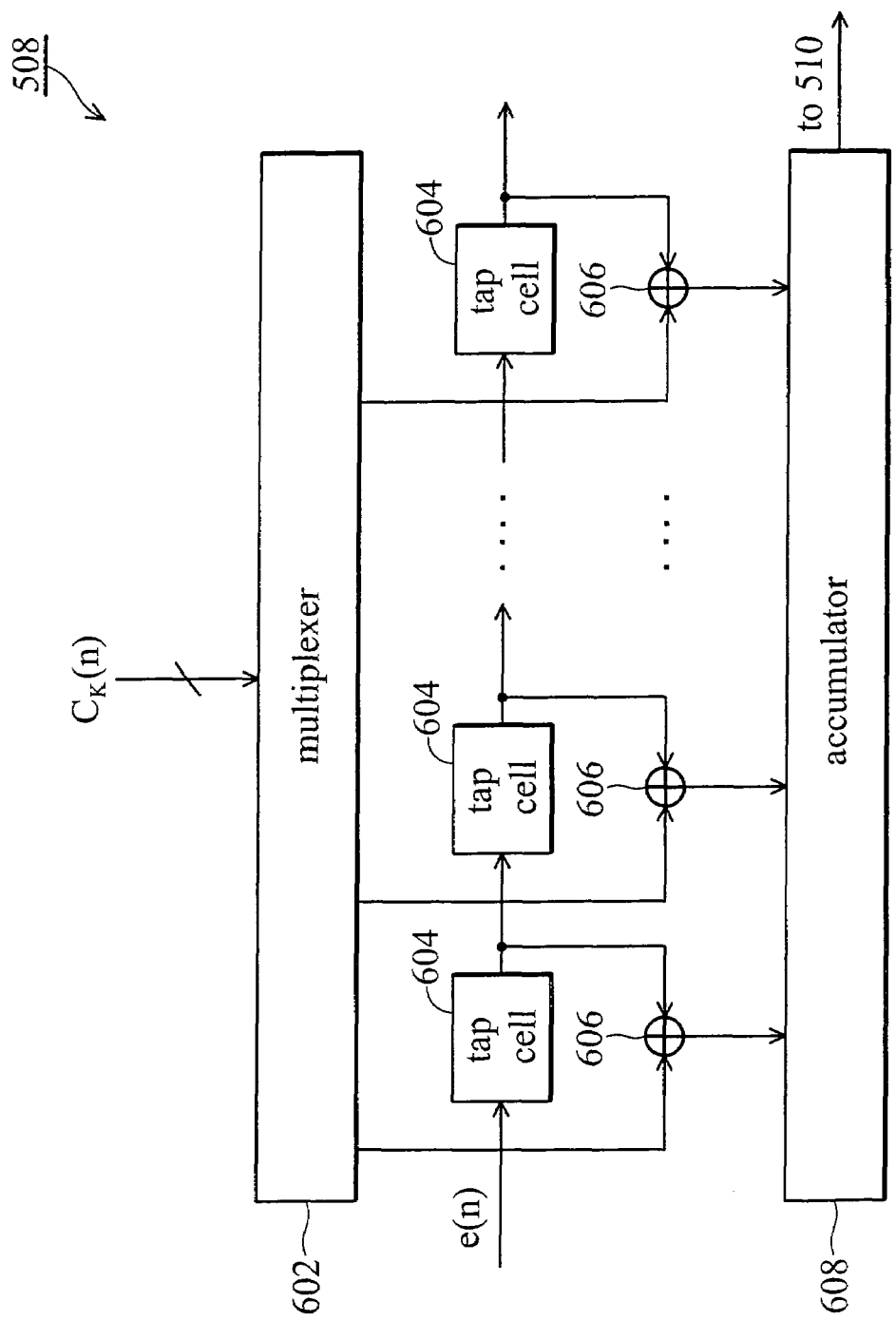
FIG. 6 shows an embodiment of the FIR array 508.

FIG. 6 shows an embodiment of the FIR array 508. A multiplexer 602 stores the coefficient vector $c_k(n)$ of the decision feedback equalizer 108. The coefficient vector $c_k(n)$ comprises a plurality of $c_k$, and the FIR array 508 comprises a plurality of tap cells 604 cascaded in series functioning as a shift register. The error signal e(n) is input to the first tap cells 604, and a plurality of multipliers 606 each multiplies an output from tap cells 604 and a corresponding coefficient. The outputs from the plurality of multipliers 606 are summed in an accumulator 608, thus the summation of equation (3) is generated.

Figure 7:
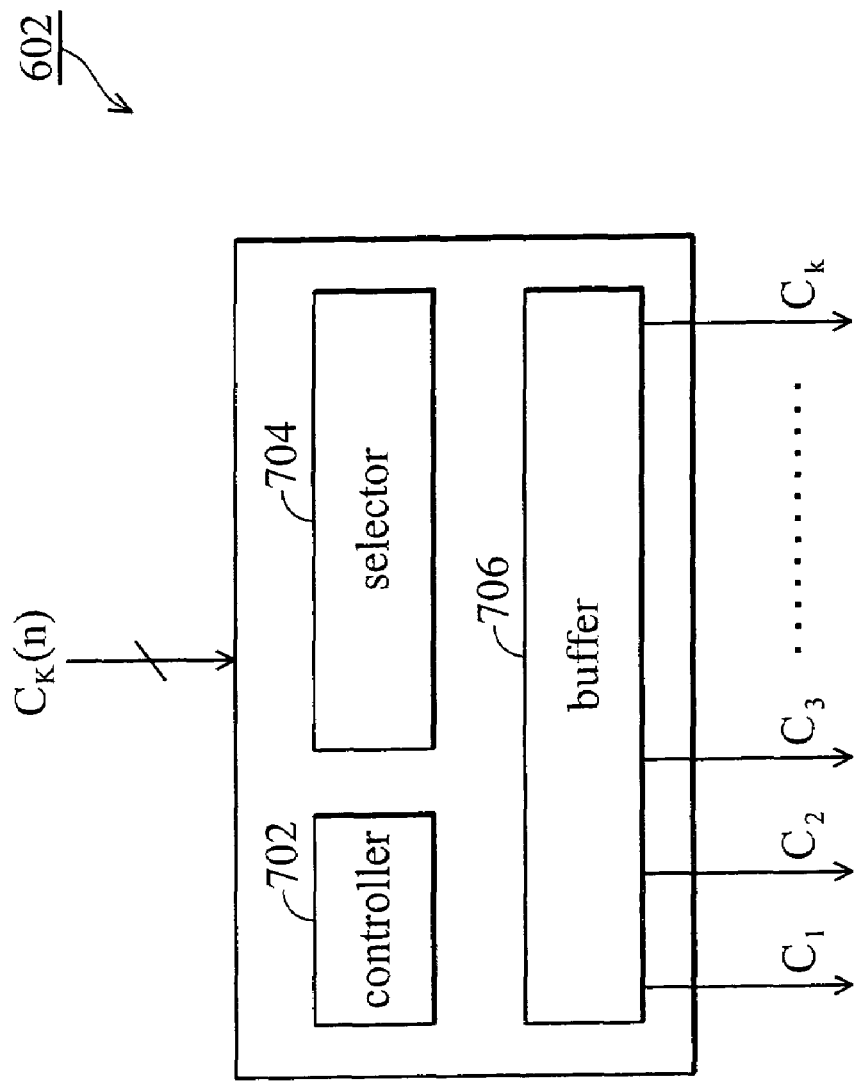
FIG. 7 shows an embodiment of the multiplexer 602.

FIG. 7 shows an embodiment of the multiplexer 602 comprising a selector 704 selectively outputting the coefficient vector $c_k(n)$ to the multipliers 606. A coefficient is output to a corresponding tap cell 604 if the coefficient exceeds a threshold or the adjacent coefficients exceed a threshold. Conversely, a coefficient is omitted if neither the coefficient nor the adjacent coefficients exceed the threshold. In a typical decision feedback equalizer 108, the coefficient vector $c_k(n)$ is recursively updated. The coefficient vector $c_k(n)$ in the multiplexer 602, however, may not require real time update, therefore a long period is sufficient, for example, a period of 832 symbols. A buffer 706 stores the coefficient vector $c_k(n)$, and a controller 702 periodically updates the buffer 706 with new coefficient vector $c_k(n)$ from the decision feedback equalizer 108 every 832 symbol times.

Figure 8:
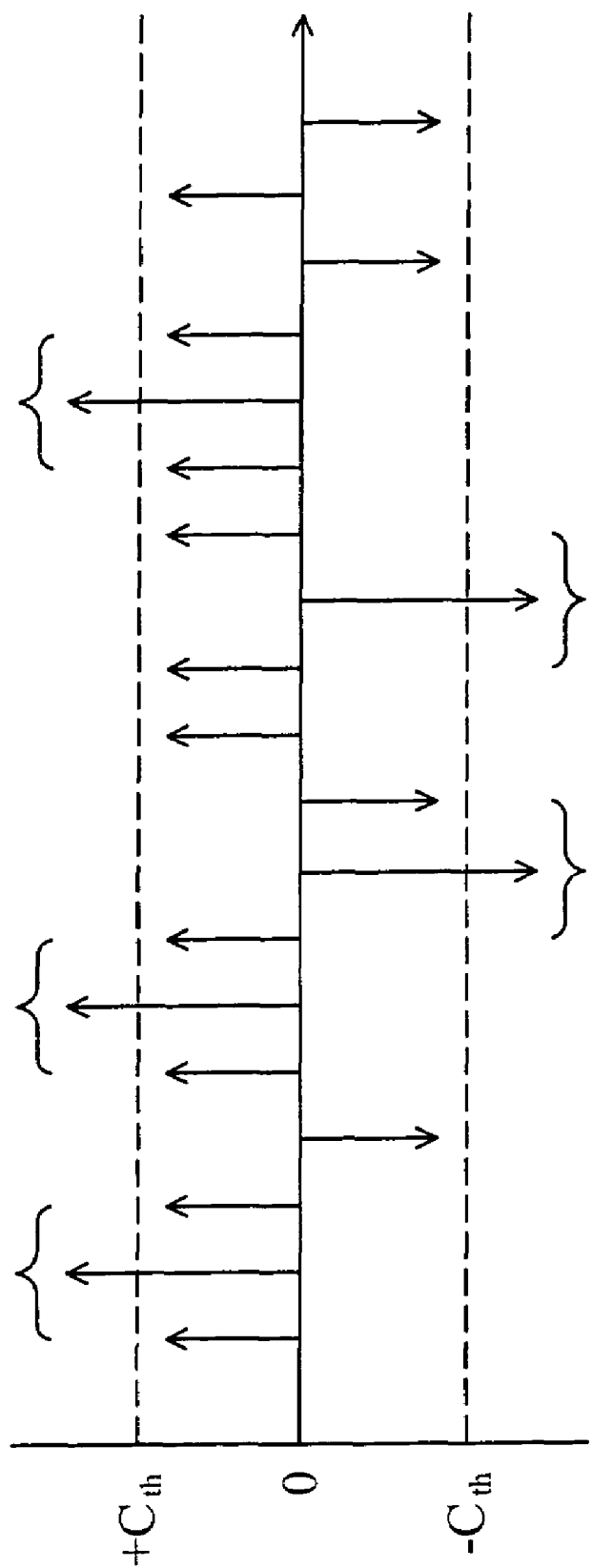
FIG. 8 is a coefficient vector diagram associated with the decision feedback equalizer 108.

FIG. 8 is a coefficient vector diagram. Thresholds $+C_{th}$ and $-C_{th}$ are shown. In the selector 704, only selected coefficients are output. For example, a coefficient exceeding the thresholds is selected, and the two adjacent coefficients may also be selected, as shown as the quotes in FIG. 8. Thus, the selected coefficients are multiplied with corresponding tap cells 604 in the multiplier 606 and contribute to the accumulator 608, conversely, the unselected coefficients do not output a value to the accumulator 608.

Figure 9:
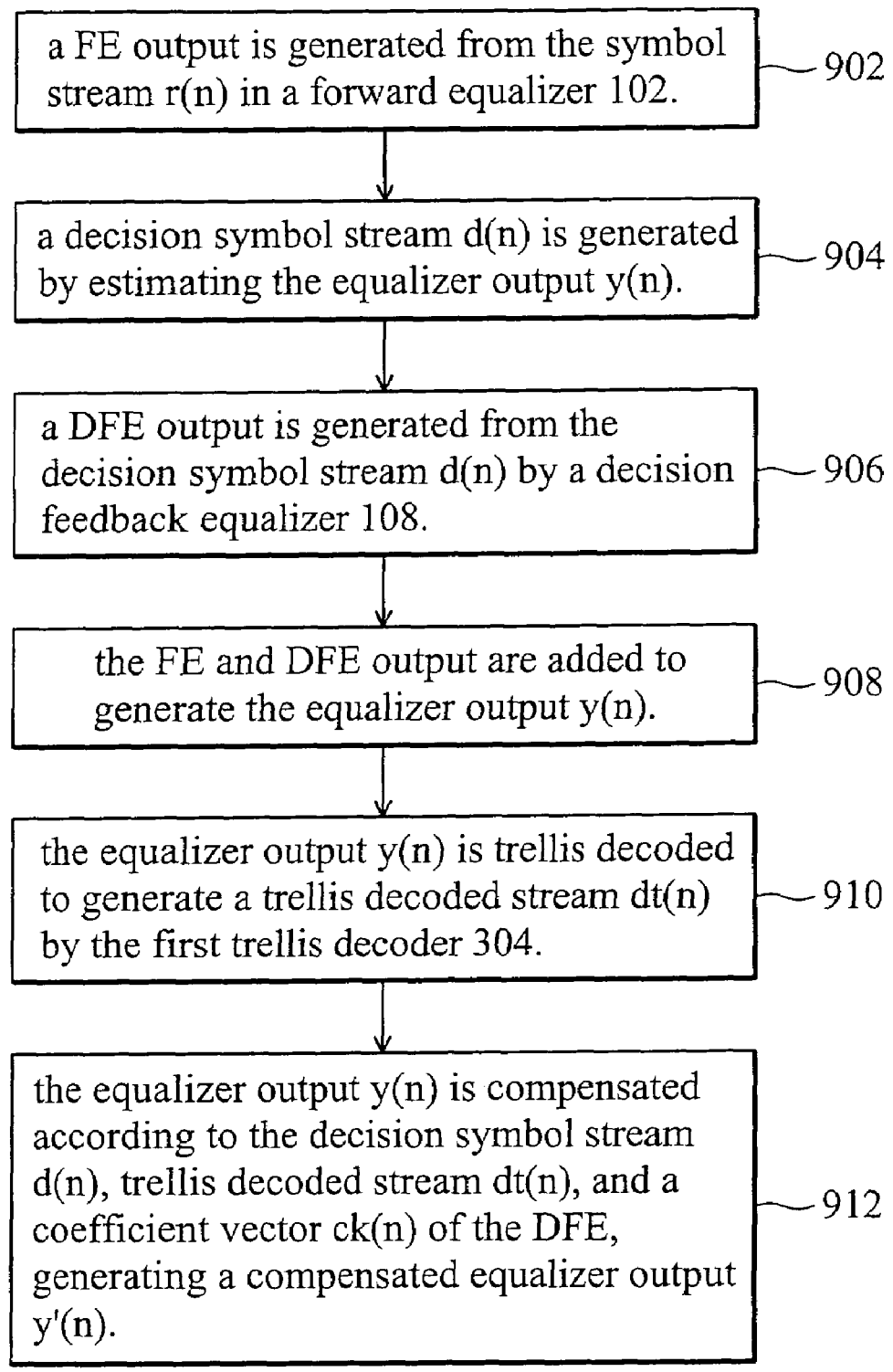
FIG. 9 is a flowchart of the decision error compensation equalizing method.

FIG. 9 is a flowchart of the decision error compensation equalizing method. The steps are actually performed in a recursive fashion as the symbol stream flows continuously. In step 902, a FE output is generated from the symbol stream r(n) in a forward equalizer 102. In step 904, a decision symbol stream d(n) is generated by estimating the equalizer output y(n). The decision symbol stream d(n) may be generated by a slicer slicing the equalizer output y(n), or from a path memory in the first trellis decoder 304 trellis decoding the equalizer output y(n) In step 906, a DFE output is generated from the decision symbol stream d(n) by a decision feedback equalizer 108. In step 908, the FE and DFE output are added to generate the equalizer output y(n). In step 910, the equalizer output y(n) is trellis decoded to generate a trellis decoded stream $d_t(n)$ by the first trellis decoder 304. The trellis decoded stream $d_t(n)$ is a final result of the trellis decoding, whereas the decision symbol stream d(n) may be a tentative path memory output of the trellis decoding. In step 912, the equalizer output y(n) is compensated according to the decision symbol stream d(n), the trellis decoded stream $d_t(n)$, and a coefficient vector $c_k(n)$ of the DFE, thus a compensated equalizer output y'(n) is generated. Specifically, an error signal e(n) is generated by comparing the decision symbol stream d(n) and trellis decoded stream $d_t(n)$, and multiplied by coefficient vector $c_k(n)$ to generate the compensation factor. Thus, compensated equalizer output y'(n) is generated according to equation (4).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive equalizer with decision error compensation, comprising:
   a forward equalizer (FE), receiving a symbol stream to generate an FE output;
   a decision feedback equalizer (DFE), receiving a decision symbol stream to generate a DFE output, wherein the decision symbol stream is an estimation of the symbol stream;
   a first adder, adding the FE and DFE outputs to generate an equalizer output;
   a first trellis decoder, receiving the equalizer output to generate a trellis decoded stream by a trellis decoding process; and
   a compensator for compensating the equalizer output according to the decision symbol stream, the trellis decoded stream, and a coefficient vector stored in the decision feedback equalizer, to generate a compensated equalizer output, wherein the compensator comprises:
   a first delay unit, receiving the equalizer output and delaying the equalizer output for a time m;
   a second delay unit, receiving the decision symbol stream and delaying the decision symbol stream for the time m;
   a comparator, generating an error signal by comparing the trellis decoded stream and the delayed decision symbol stream;
   an FIR array, generating a summation from the multiplication of the coefficient vector and the error signal; and
   a second adder, adding the delayed equalizer output and the summation to generate the compensated equalizer output.

2. The adaptive equalizer as claimed in claim 1, wherein the FIR array comprises:
   a multiplexer, receiving the coefficient vector;
   a plurality of tap cells coupled in series to delay the error signal sequentially;
   a plurality of multipliers, each coupled to the multiplexer and a corresponding tap cells, multiplying a delayed error signal and one coefficient;
   an accumulator for adding the multiplication results to generate the summation.

3. The adaptive equalizer as claimed in claim 2, wherein the multiplexer comprises a selector processing the coefficient vector before being output to the multipliers by:
   outputting a coefficient to a corresponding tap cell if the coefficient exceeds a threshold or the adjacent coefficient exceeds a threshold; and
   omitting a coefficient if neither the coefficient nor the adjacent coefficient exceeds the threshold.

4. The adaptive equalizer as claimed in claim 2, wherein the multiplexer comprises:
   a controller, periodically delivering a control signal; and
   a buffer for storing the coefficient vector; wherein
   when the control signal is delivered, the buffer is updated with the current coefficient vector from the decision feedback equalizer.

5. An equalization method for generating an equalizer output from a symbol stream and compensating a decision error thereof, comprising:
   performing a forward equalization (FE) on the symbol stream to generate an FE output;
   estimating the equalizer output to generate a decision symbol stream;
   performing a decision feedback equalization (DFE) on the decision symbol stream to generate a DFE output;
   adding the FE and DFE outputs to generate the equalizer output;
   trellis decoding the equalizer output to generate a trellis decoded stream; and
   compensating the equalizer output according to the decision symbol stream, the trellis decoded stream, and a coefficient vector corresponding to the decision feedback equalization, to generate a compensated equalizer output, wherein the compensation comprises:
   delaying the equalizer output for a time m;
   delaying the decision symbol stream for the time m;
   comparing the trellis decoded stream and the delayed decision symbol stream to generate an error signal;
   summing the multiplication of the coefficient vector and the error signal; and
   adding the delayed equalizer output and the summation to generate the compensated equalizer output.

6. The equalization method as claimed in claim 5, wherein the compensation further comprises:
   delaying the error signal to generate a plurality of delayed error signals;
   multiplying each delayed error signal and a corresponding coefficient;
   summing all the multiplications to generate the summation.

7. The equalization method as claimed in claim 6, wherein the multiplication further comprises:
   multiplying a coefficient and a corresponding delayed error signal if the coefficient or adjacent coefficients exceed a threshold; and
   skipping the multiplication if neither the coefficient nor the adjacent coefficients exceed the threshold.

8. The equalization method as claimed in claim 6, wherein the coefficient vector stored in the buffer is updated periodically with the decision feedback equalization.

* * * * *

UNITED STATES PATENT AND TRADEMARK OFFICE
CERTIFICATE OF CORRECTION

PATENT NO.       : 7,613,238 B2                              Page 1 of 1
APPLICATION NO.  : 11/225636
DATED            : November 3, 2009
INVENTOR(S)      : Chiao-Chih Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Nineteenth Day of October, 2010

David J. Kappos
*Director of the United States Patent and Trademark Office*